United States Patent [19]

Nakao et al.

[11] Patent Number: 5,283,770
[45] Date of Patent: Feb. 1, 1994

[54] METHOD OF RECORDING INFORMATION ON AND REPRODUCING INFORMATION FROM MAGNETO-OPTICAL RECORDING MEDIUM

[75] Inventors: Isamu Nakao, Tokyo; Masahiko Kaneko, Kanagawa, both of Japan

[73] Assignee: Sony Corporation, Tokyo, Japan

[21] Appl. No.: 956,047

[22] Filed: Oct. 2, 1992

[30] Foreign Application Priority Data

Oct. 9, 1991 [JP] Japan .................................. 3-262364

[51] Int. Cl.$^5$ ........................ G11B 11/00; G11B 5/02
[52] U.S. Cl. ...................................... 369/13; 360/59; 360/114
[58] Field of Search ................... 369/13, 112, 14, 110, 369/275.1, 275.2, 275.3, 272; 360/59, 114, 131, 135, 137, 66; 365/122; 428/694, 900

[56] References Cited

U.S. PATENT DOCUMENTS 5,164,925 11/1992 Sato et al. .............................. 369/13
5,175,721 12/1992 Nakayama et al. ................ 369/13 X Primary Examiner—Robert J. Pascal
Assistant Examiner—Ali Neyzar
Attorney, Agent, or Firm—Philip M. Shaw, Jr.

[57] ABSTRACT

A magneto-optical recording medium has a multi-layer magnetic film comprising at least a reproducing layer, a memory layer, and a recording layer which are successively deposited in magnetically coupled relationship to each other. Information is recorded on the magneto-optical recording medium selectively in a first state in which the reproducing layer and the memory layer are magnetized by copying a magnetized condition of the recording layer, with a intensity-modulated light beam of a low intensity applied to the magneto-optical recording medium, or a second state in which the reproducing layer, the memory layer, and the recording layer are magnetized by an external recording magnetic field, with a intensity-modulated light beam of a high intensity applied to the magneto-optical recording medium. Recorded information is reproduced from the magneto-optical recording medium by copying the information from the memory layer to the reproducing layer in a limited high-temperature region which is produced due to a temperature distribution within a spot of a reproducing light beam applied to the magneto-optical recording medium.

2 Claims, 7 Drawing Sheets

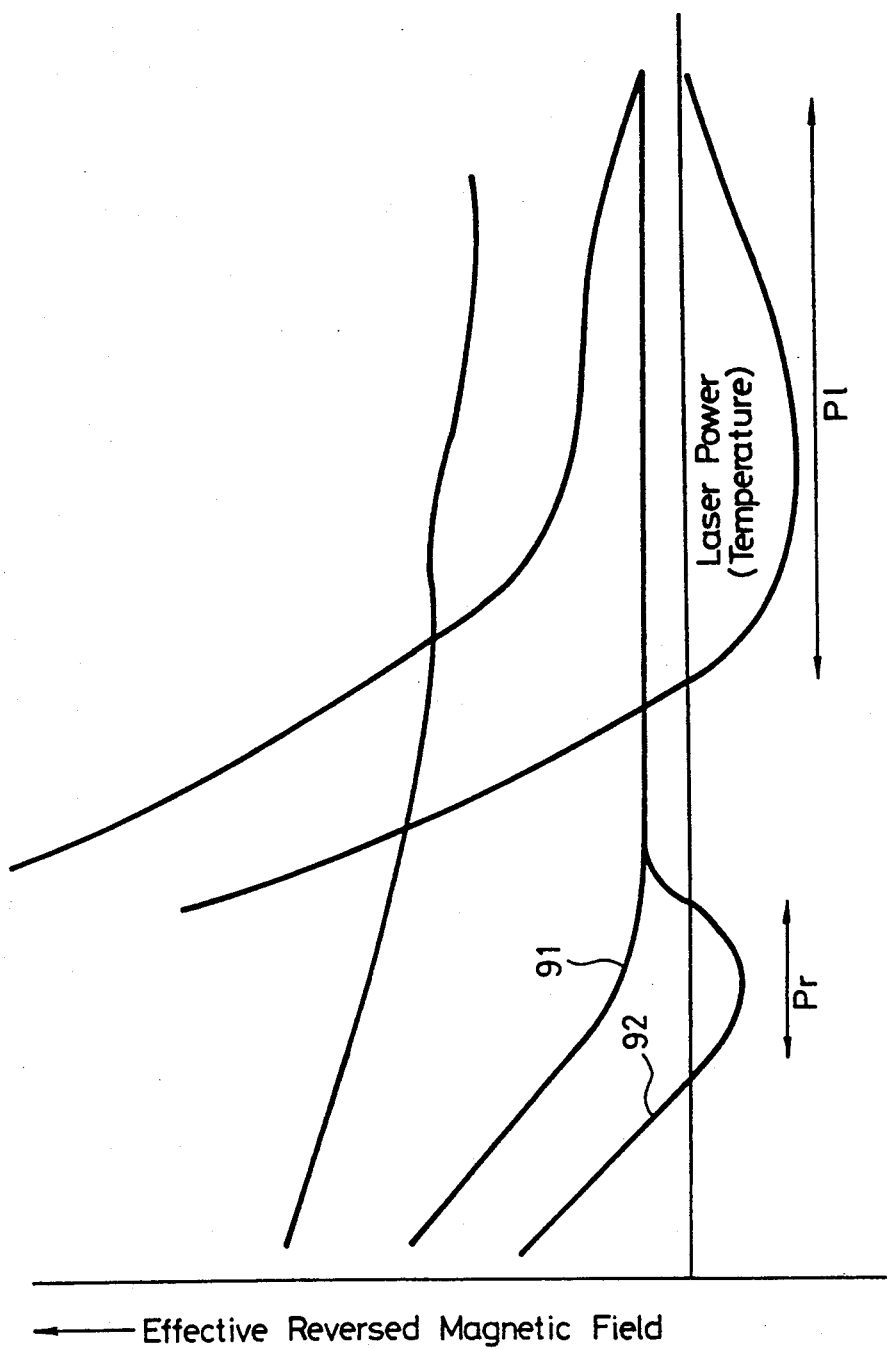

METHOD OF RECORDING INFORMATION ON AND REPRODUCING INFORMATION FROM MAGNETO-OPTICAL RECORDING MEDIUM

BACKGROUND OF THE INVENTION

1. Field of the Invention

The present invention relates to a method of recording information on and reproducing information from a magnetooptical recording medium.

2. Description of the Prior Art

In the magnetooptical information recording and reproducing process, a light beam such as a laser beam is applied to a magnetooptical recording medium to form information recording pits or bubble magnetic domains where information is recorded, and the recorded information is read by a magnetooptical interaction known as the Kerr effect or the Faraday effect. To increase recording density of the magnetooptical recording medium, the size of information recording pits may be reduced. The resolution with which the recorded information can be reproduced from the magnetooptical recording medium is governed by the wavelength $\lambda$ of a reading laser beam applied to the magnetooptical recording medium and the numerical aperture N.A. of the objective lens through which the reading laser beam is applied to the magnetooptical recording medium.

Efforts have been made to increase the resolution beyond the above limitation, i.e., to accomplish super-resolution. One such attempt is disclosed in Japanese laid-open patent publication No. 3-93058. The disclosed process employs a magnetooptical recording medium having a multilayer magnetic film structure including a reproducing layer and a recording layer. To read information recorded on the magnetooptical recording medium, a reading laser beam is applied to the magnetooptical recording medium, and, utilizing a temperature distribution of the magnetooptical recording medium within the spot of the applied laser beam due to the relative movement of the reading laser beam and the magnetooptical recording medium, information pits or magnetic domains are copied from the recording layer to the reproducing layer only in a local high-temperature region within the laser beam spot. This process is referred to as "RAD-MSR" process.

However, no special consideration is given to a recording process. According to the usual recording process, the information that has already been recorded on the magnetooptical recording medium is erased, and then new information is recorded on the magnetooptical recording medium. Therefore, the time required to record new information is relatively long, and the device used to record new information is relatively complex in structure.

More specifically, when information is to be recorded on a magnetooptical recording medium, i.e., information pits or magnetic domains are to be formed on the magnetooptical recording medium, any existing information is erased from the magnetooptical recording medium by magnetizing the magnetooptical recording medium in a uniform direction perpendicular to a magnetic film on the magnetooptical recording medium, and then a light beam such as a laser beam is applied to heat a local region of the magnetooptical recording medium for forming information pits therein that are perpendicularly magnetized in a direction opposite to the above uniform direction, thereby recording the information in binary form. This magnetooptical recording process, however, cannot record desired information in a short period of time as any previously recorded information must be erased before new information is recorded.

In view of the above problem, there have been proposed overwriting recording processes which are free of any independent erasing procedure.

These proposed recording processes include a magnetic-field-modulated recording process which modulates an external field to be applied to a magnetooptical recording medium depending on an information signal and a double-head recording process which uses a recording head and an erasing head.

One magnetic-field-modulated recording process is disclosed in Japanese laid-open patent publication No. 60-48806, for example. According to the disclosed process, to record information on a recording medium with an amorphous ferrimagnetic thin film having an easily magnetizable axis extending perpendicularly thereto, a laser beam is applied to an overwrite region on the recording medium to heat the same, and a magnetic field with its polarity corresponding to the status of an input digital signal is applied to the overwrite region for thereby recording the information. However, attempts to record desired information on the recording medium at high speed with a high information transfer rate require an electromagnet that can operate at high frequencies of several megahertz. Such an electromagnet cannot easily be fabricated, consumes a large amount of electric energy, and dissipates a large amount of heat.

The double-head recording process needs an extra head, with the two heads positioned in spaced-apart relationship. The magnetooptical drive systems based on the double-head recording process are put under large burden during operation, are not economic, and do not lend themselves to mass-production.

To solve the above problems, there has also been proposed another overwriting recording method which record new information over previously recorded information on a recording medium having recording and reproducing layers. Such an overwriting recording method is disclosed in Japanese laid-open patent publication No. 63-52354, for example.

According to this overwriting recording method, a light beam is intensity-modulated by information to be recorded and applied to heat a thermomagnetic (magnetooptical) recording medium to switch the recording medium, depending on the information to be recorded, between a first heated state in which the recording medium is heated to a first temperature $T_1$ that is higher than the Curie temperature $T_{C1}$ of the reproducing layer and at which the magnetic moment of the recording layer is not reversed, and a second heated state in which the recording medium is heated to a second temperature $T_2$ that is higher than the Curie temperature $T_{C1}$ and which is high enough to reverse the magnetic moment of the recording layer. When the recording medium is cooled from the above first and second heated states, two magnetized states are formed for thereby recording binary information on the recording medium.

The above recording method allows desired information to overwrite the recording medium with a light beam such as a laser beam that is intensity-modulated by such desired information.

OBJECTS AND SUMMARY OF THE INVENTION

It is an object of the present invention to provide a method of reproducing information on a magnetooptical recording medium according to the RAD-MSR process and recording information from the magnetooptical recording medium in an overwriting mode, so that recorded information can be reproduced with super-resolution and desired information can be recorded efficiently with a relatively simple arrangement.

According to the present invention, there is provided a method of recording information on and reproducing information from a magnetooptical recording medium having a multilayer magnetic film comprising at least a reproducing layer, a memory layer, and a recording layer which are successively deposited in magnetically coupled relationship to each other, the method comprising the steps of recording information on the magnetooptical recording medium selectively in a first state in which the reproducing layer and the memory layer are magnetized by copying a magnetized condition of the recording layer, with a intensity-modulated light beam of a low intensity applied to the magnetooptical recording medium, or a second state in which the reproducing layer, the memory layer, and the recording layer are magnetized by an external recording magnetic field, with a intensity-modulated light beam of a high intensity applied to the magnetooptical recording medium, and reproducing recorded information from the magnetooptical recording medium by copying the information from the memory layer to the reproducing layer in a limited high-temperature region which is produced due to a temperature distribution within a spot of a reproducing light beam applied to the magnetooptical recording medium.

The multilayer magnetic film may comprise a main reproducing layer, an auxiliary reproducing layer, a first intermediate layer, a memory layer, a second intermediate layer, and a recording layer which are successively deposited in magnetically coupled relationship to each other.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 9 is a graph showing the relationship between laser power and coercive and exchange forces of each layer of the magnetooptical recording medium shown in FIG. 8.

DETAILED DESCRIPTION OF THE PREFERRED EMBODIMENTS

Figure 1:
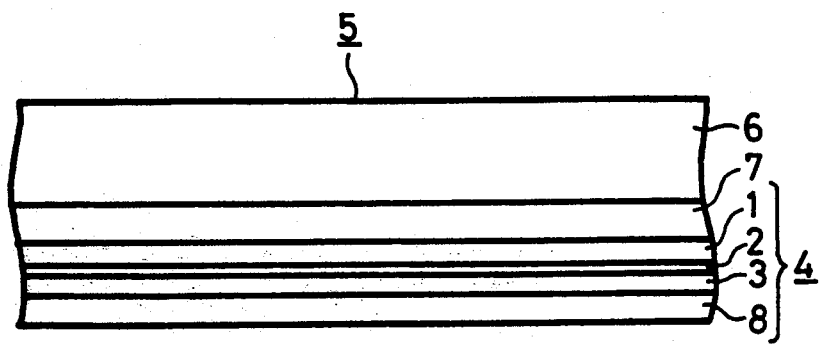
FIG. 1 is a fragmentary cross-sectional view of a magnetooptical recording medium used in the present invention.

As shown in FIG. 1 a magnetooptical recording medium 5 used in the present invention, which may typically be in the form of a magnetooptical disk, comprises a dielectric layer 7, a multilayer magnetic film 4, and a protective film 8 which are successively deposited on a transparent substrate 6.

The dielectric layer 7 may comprise an SiN film or the like, and serves to protect the multilayer magnetic film 4 and also to achieve Kerr enhancement. The protective film 8 may also be made of SiN or the like.

The multilayer magnetic film 4 comprises a reproducing layer 1, a memory layer 2, and a recording layer 3 which are successively deposited in magnetically coupled relationship to each other. The multilayer magnetic film 4 is a perpendicularly magnetized film with the compensation temperature being not present in the range of operating temperatures. It may be of a rare-earth transition-metal alloy with the transition metal being richer than the rare earth, or a rare-earth transition-metal alloy with the rare earth being richer than the transition metal, i.e., of a composition whose rare earth is richer than the composition whose composition temperature is lower than the temperature at which it is used, that is, sufficiently lower than at least room temperature.

Figure 2:
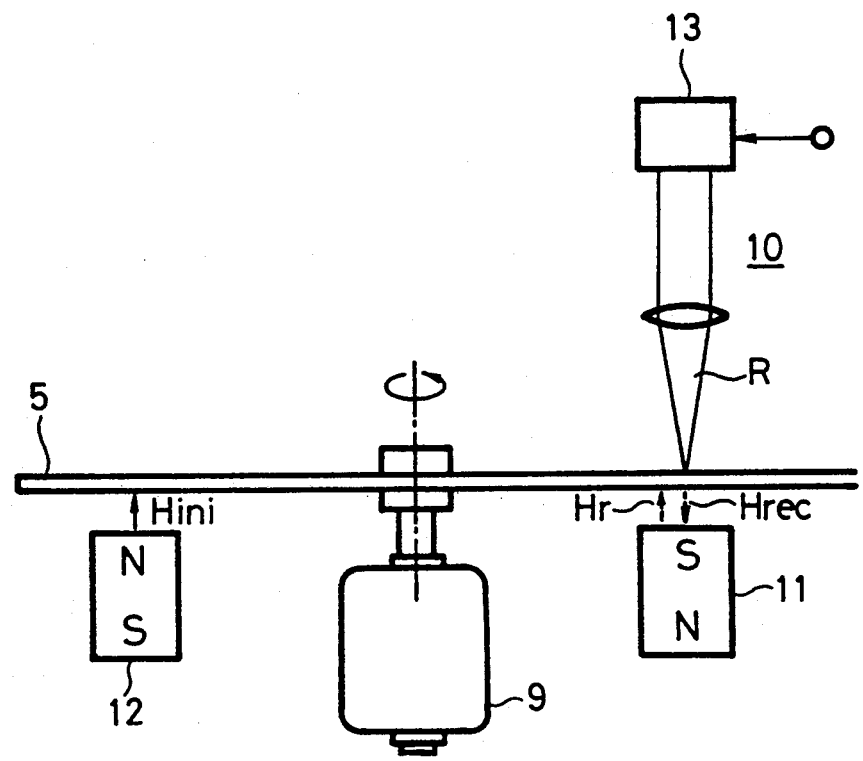
FIG. 2 is a side elevational view of a magnetooptical drive device used in the present invention.

FIG. 2 shows a magnetooptical drive device used in the present invention. The magnetooptical drive device has a motor 9 for rotating a magnetooptical recording medium 5, which is in the form of a magnetooptical disk, about its central axis. The magnetooptical drive device also has an optical recording and reproducing head 10 for applying a laser beam R to the recording medium 2 from the substrate side.

The optical recording and reproducing head 10 is actuated by an actuator (not shown) to move the applied spot of the laser beam R radially with respect to the magnetooptical recording medium 5, i.e., to cause the applied spot of the laser beam R on the magnetooptical recording medium 5 to follow a spiral or concentric path about the center of the magnetooptical recording medium 5.

The magnetooptical drive device also has a first magnetic field generator 11 such as a permanent magnet or an electromagnet for applying a recording magnetic field $H_{rec}$ to a region of the magnetooptical recording medium 5 where the laser beam R is applied, and a second magnetic field generator 12 such as a permanent magnet or an electromagnet positioned in another location than the position of the first magnetic field generator 11, for applying a predetermined initializing magnetic field $H_{ini}$ to the magnetooptical recording medium 5.

Desired information can be recorded on the magnetooptical recording medium 5 when an overwriting binary intensity-modulated laser beam R is applied to heat the magnetooptical recording medium 5 selectively to a temperature $T_1$ or a temperature $T_2$ with the applied laser beam spot irrespective of whether there is already an information recording pit or not on the magnetooptical recording medium 5.

EMBODIMENT 5

In this embodiment, a magnetooptical recording medium 5 includes a three-layer magnetic film 4 composed of a reproducing layer 1, a memory layer 2, and a recording layer 3. Initializing, reproducing, and recording processes for the magnetooptical recording medium 5, and various conditions required of the layers 1, 2, 3 will be described below.

Figure 3:
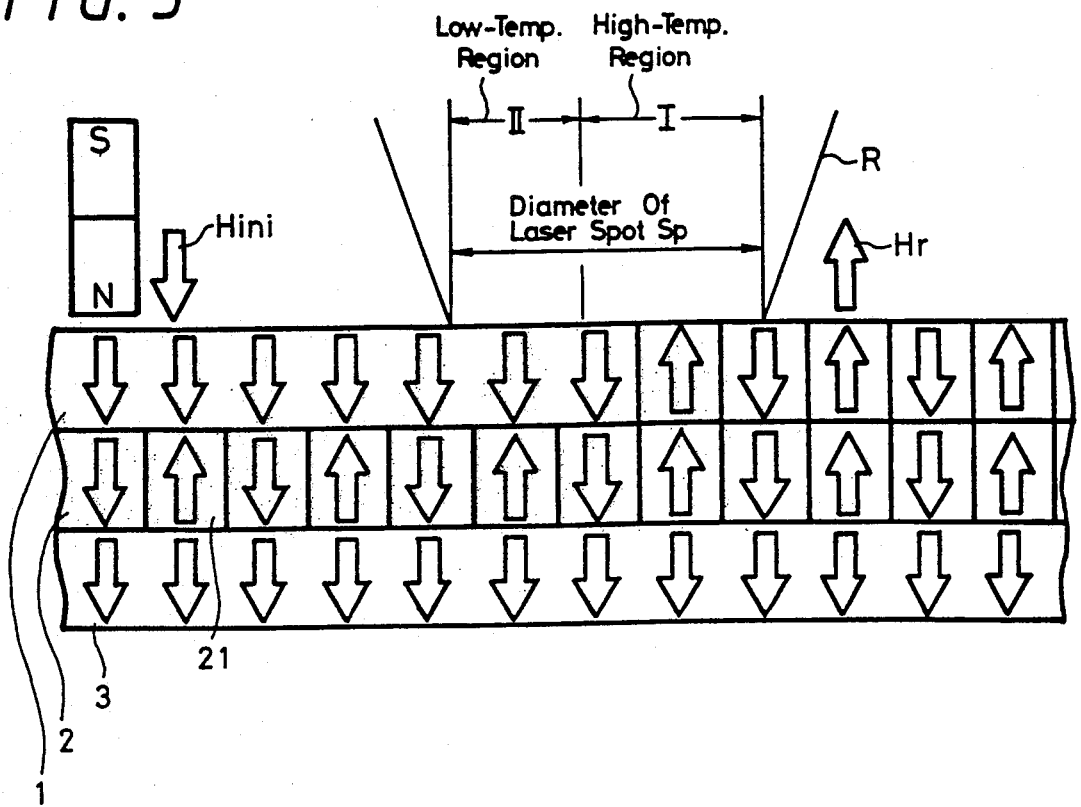
FIG. 3 is a schematic view illustrative of a reproducing process according to the present invention.

FIG. 3 schematically shows magnetized states, indicated by the hollow arrows, of the reproducing layer 1, the memory layer 2, and the recording layer 3 in the reproducing process and the initializing process prior thereto.

First, the initializing process using the initializing magnetic field $H_{ini}$ produced by the second magnetic field generator 12 shown in FIG. 2 will be described below.

Initializing Process

In the initializing process, the reproducing layer 1 and the recording layer 3 are magnetized in the direction of the initializing magnetic field $H_{ini}$ (downwardly in FIG. 3). For such magnetization of the reproducing layer 1 and the recording layer 3, it is necessary to satisfy the conditions indicated by the following inequalities (1) through (5):

$$H_{c1} + H_{w1} < H_{ini} \quad (1)$$

$$H_{c1} > H_{w1} \quad (2)$$

$$H_{c2} - H_{w21} - H_{w23} > N_{ini} \quad (3)$$

$$H_{c3} + H_{w3} < H_{ini} \quad (4)$$

$$H_{c3} > H_{w3} \quad (5)$$

where $H_{c1}$, $H_{c2}$, $H_{c3}$ are the coercive forces of the layers 1, 2, 3, respectively, $H_{w1}$ the exchange force which the memory layer 2 applies to the reproducing layer 1, $H_{w21}$ the exchange force which the reproducing layer 1 applies to the memory layer 2, $H_{w23}$ is the exchange force which the recording layer 3 applies to the memory layer 2, and $H_{w3}$ is the exchange force which the memory layer 2 applies to the recording layer 3. These exchange forces are expressed by the following equations (6) through (9):

$$H_{w1} = \frac{\sigma_{w12}}{2M_{s1}h_1} \quad (6)$$

$$H_{w21} = \frac{\sigma_{w12}}{2M_{s2}h_2} \quad (7)$$

$$H_{w23} = \frac{\sigma_{w23}}{2M_{s2}h_2} \quad (8)$$

$$H_{w3} = \frac{\sigma_{w23}}{2M_{s3}h_3} \quad (9)$$

where Ms, Hc, h, and $\sigma_w$ are the saturation magnetization, the coercive force, the film thickness, and the interfacial magnetic domain wall energy, respectively, and the suffixes 1, 2, 3 represent the reproducing layer 1, the memory layer 2, and the recording layer 3, respectively.

The inequalities (1), (4) are conditions to be satisfied for the reproducing layer 1 and the recording layer 3 to be initialized with the initializing magnetic field $H_{ini}$. The inequalities (2), (5) are conditions necessary to maintain the initialized states of the reproducing layer 1 and the recording layer 3. The inequality (3) is a condition to be met for recording pits 21, which are magnetized upwardly in FIG. 3, not to be erased in the memory layer 2.

Reproducing Process

The reproducing process is carried out after the above initializing process.

In the reproducing process, recorded information is reproduced by applying, to the magnetooptical recording medium 5, a laser beam R having a power Pr which is lower than a high-intensity laser power Ph and a low-intensity laser power Pl which are applied in the recording process (described later on), as indicated by the following inequality (10):

$$Pr < Pl < Ph \quad (10).$$

Figure 4:
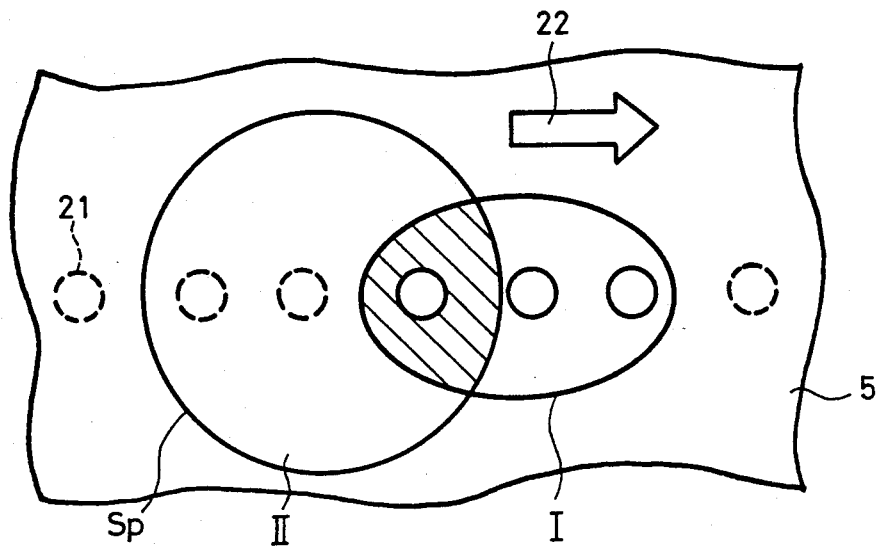
FIG. 4 is a fragmentary view showing the relationship between a laser spot and a recording pit.

When the magnetooptical recording medium 5 moves relatively to the laser beam R, a temperature distribution is produced on the magnetooptical recording medium 5 due to the application of the laser beam R. More specifically, as shown in FIG. 4, when the magnetooptical recording medium 5 moves in the direction indicated by the arrow 22 with respect to a spot Sp of the laser beam R, a high-temperature region I having a temperature Ta or higher is generated on the magnetooptical recording medium 5 downstream of the laser beam spot Sp with respect to the direction indicated by the arrow 22. Therefore, the high-temperature region I and a low-temperature region II having a temperature lower than the temperature Ta of the high-temperature region I coexist in the laser beam spot Sp.

According to the present invention, the following inequalities (11) through (13) are satisfied in the low-temperature region II in the laser beam spot Sp, i.e., at a temperature lower than the temperature Ta:

$$H_{c1} > H_{w1} \quad (11)$$

$$H_{c2} > H_{w21} + H_{w23} \quad (12)$$

$$H_{c3} > H_{w3} \quad (13).$$

The above inequalities (11) through (13) are conditions to be met for the above initialized states to be maintained and also for the recording pits 21 to remain as latent images in the memory layer 2.

At this time, in the high-temperature region I, the coercive force $H_{c1}$ of the reproducing layer 1 is reduced, and the exchange force $H_{w1}$ applied to the reproducing layer 1 by the memory layer 2 is lowered. A recording pit 21 of the memory layer 2 is copied to the reproducing layer 1, so that the recording pit 21 can be reproduced by way of a magnetooptical interaction of the laser beam spot Sp or the laser beam R and the reproducing layer 1.

That is, the following conditions (14) through (16) are satisfied at the temperature Ta or higher:

$$H_{c1} < H_{w1} \quad (14)$$

$$H_{c2} > H_{w23} + H_{w21} \quad (15)$$

$$H_{c3} > H_{w3} \quad (16).$$

In this manner, a recording pit 21 appears on the reproducing layer 1 and can be read only in the limited high-temperature region I in the laser beam spot Sp, i.e., the region which is shown hatched where the laser beam spot Sp and the high-temperature region I overlap each other as shown in FIG. 4. When the spatial frequency of the recording pits 21, the temperature characteristics of the magnetooptical recording medium 5, and the laser power Pr are selected such that only one pit 21 is present in the hatched high-temperature region I in the laser beam spot Sp, one recording pit 21 can be read with super-resolution without limitations posed by the numerical aperture N.A. of the optical system of the magnetooptical drive device and the wavelength λ of the laser beam R.

To assist in moving the magnetic domain wall upon copying the recording pit 21 from the memory layer 2 to the reproducing layer 1, an auxiliary magnetic field Hr may be applied in a direction opposite to the initializing magnetic field $H_{ini}$ by the first magnetic field generator 11, for example. When the auxiliary magnetic field Hr is applied, the above inequalities (11) through (16) are modified into the following inequalities (17) through (22), respectively:

$$H_{c1} > H_{w1} + Hr \quad (17)$$

$$H_{c2} > H_{w21} + H_{w23} - Hr \quad (18)$$

$$H_{c3} > H_{w3} + Hr \quad (19)$$

$$H_{c1} < H_{w1} + Hr \quad (20)$$

$$H_{c2} > H_{w21} + H_{w23} - Hr \quad (21)$$

$$H_{c3} > H_{w3} + Hr \quad (22)$$

Recording Process

Desired information is recorded in binary form on the magnetooptical recording medium 5 using selectively the low-intensity laser power (which may also be referred to as "low power") Pl or the high-intensity laser power (which may also be referred to as "high power") Ph which satisfy the relationship indicated by the inequality (10) indicated above.

The recording process using the low power Pl will first be described below. The laser beam R of the low power Pl is applied to the magnetooptical recording medium 5 so that the high-temperature region I is heated to a first temperature $T_1$. At the first temperature $T_1$, the reproducing layer 1 is of such a composition that its coercive force $H_{c1}$ is of a value sufficiently smaller than the exchange force $H_{w1}$, causing the memory layer 2 and the reproducing layer 1 to be magnetized in the same direction. Therefore, the operation of the memory layer 2 and the reproducing layer 1 can be described by the average physical quantities of these layers. At the temperature $T_1$ that is achieved when the laser beam R of the low power Pl is applied to the magnetooptical recording medium 5, their average coercive force $H_{cav}$ and average saturation magnetization $H_{sav}$ are required to meet the following conditions:

$$H_{cav} < H_{wav} - H_{rec} \quad (23)$$

$$H_{c3} > H_{w3} + H_{rec} \quad (24)$$

where $$H_{wav} = \frac{\sigma_{w23}}{2M_{sav}(h_1 + h_2)} \quad (25)$$

$$M_{sav} = \frac{M_{s1}h_1 + M_{s2}h_2}{h_1 + h_2} \quad (26)$$

$$H_{cav} = \frac{M_{c1}M_{s1}h_1 + H_{c2}M_{s2}h_2}{M_{s1}h_1 + M_{s2}h_2} \quad (27)$$

where $H_{rec}$ is the recording magnetic field produced by the first magnetic field generator 11, and $H_{wav}$ the average of the exchange forces that are exerted to the reproducing layer 1 and the memory layer 2.

Figure 5:
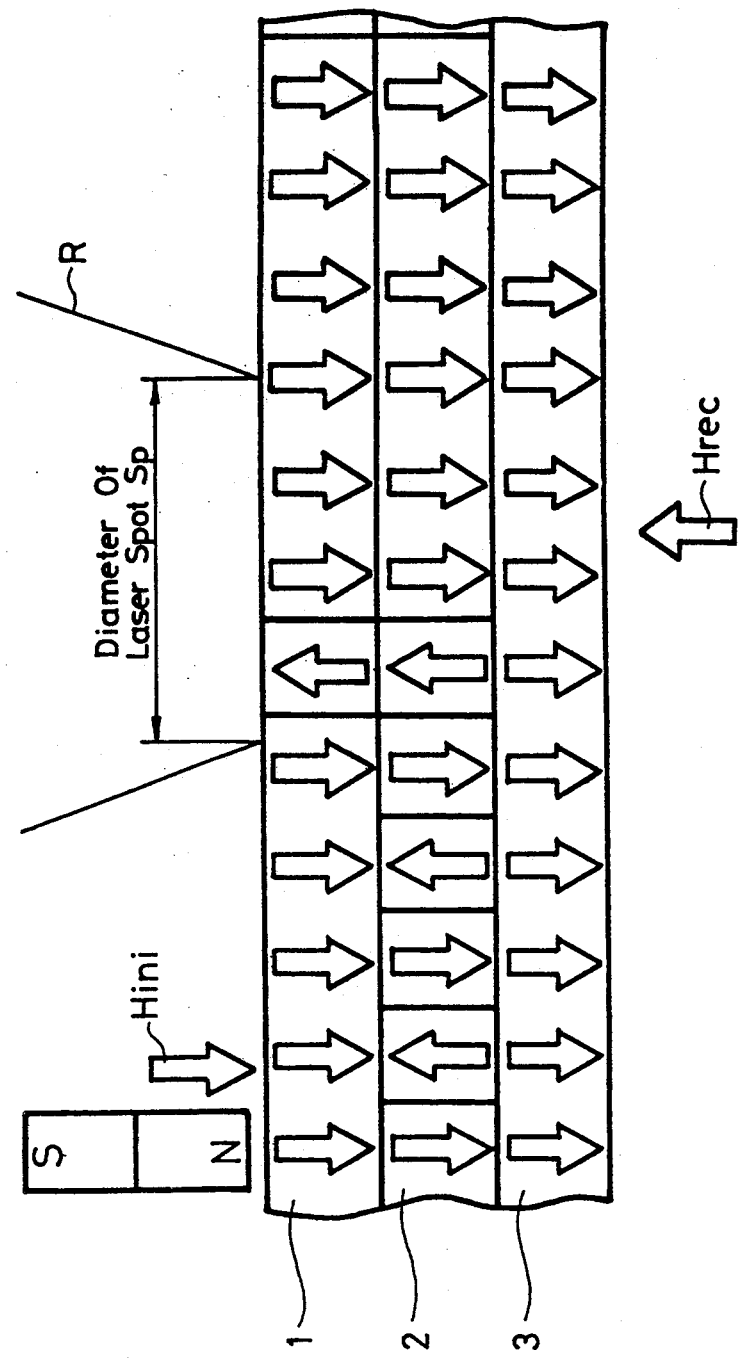
FIG. 5 is a schematic view illustrative of a first recording process according to the present invention.

Actually, the average $H_{wav}$ of the exchange forces is much larger than the recording magnetic field $H_{rec}$ ($H_{wav} > H_{rec}$). With this relationship, the average coercive force $H_{cav}$ of the memory layer 1 and the reproducing layer 2 is sufficiently smaller than the exchange force average $H_{wav}$ according to the condition (23) above. Therefore, even when the recording magnetic field $H_{rec}$ is applied in the opposite direction, as shown in FIG. 5, the magnetization is reversed, i.e., erased. At this time, the recording layer 3 remains initialized notwithstanding the application of the recording magnetic field $H_{rec}$ according to the condition (24).

In this manner, a first state which may be of "0", for example, can be recorded upon the application of the laser beam R of the low power Pl to the magnetooptical recording medium 5.

When the laser beam R of the high power Ph is applied to the magnetooptical recording medium 5, on the other hand, the reproducing layer 1 and the recording layer 3 are magnetized in the direction opposite to the direction of magnetization in the initializing process, together with the memory layer 2, thereby recording a second state which may be of "1", for example.

Figure 6:
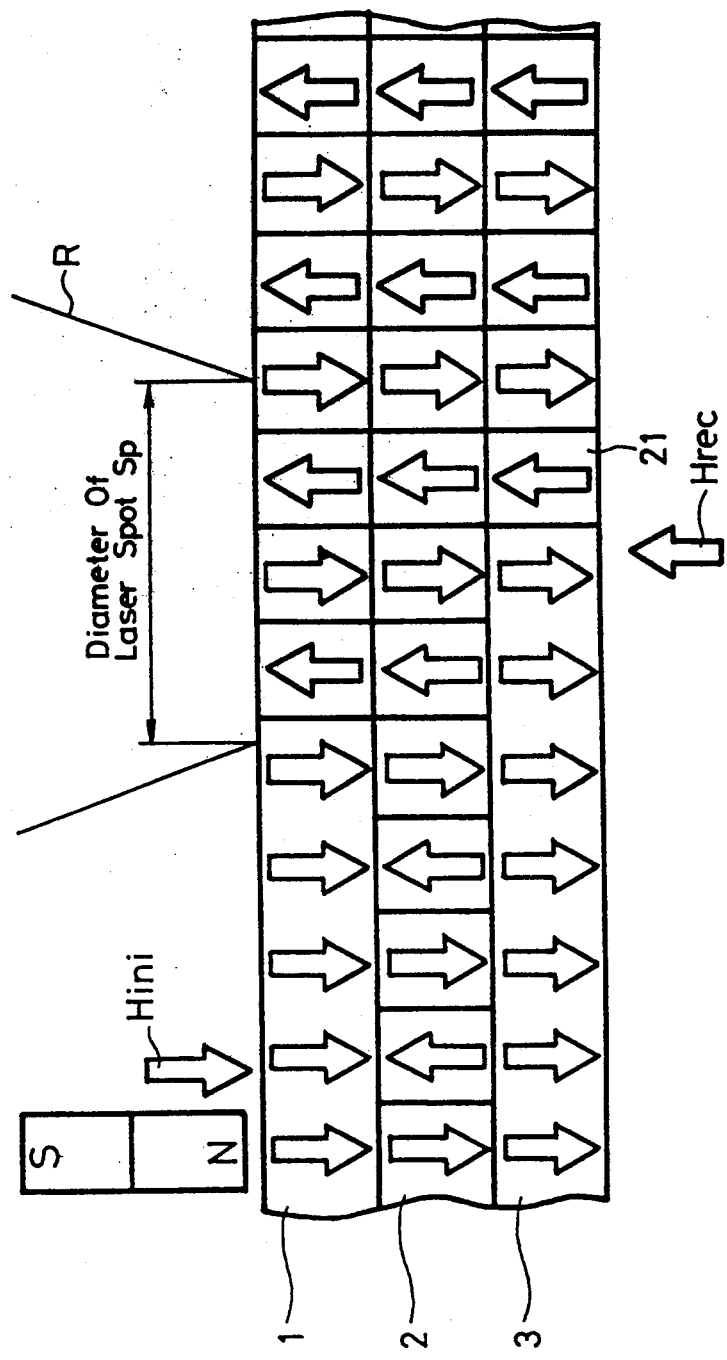
FIG. 6 is a schematic view illustrative of a second recording process according to the present invention.

More specifically, when the laser beam R of the high power Ph is applied to the magnetooptical recording medium 5, the laser beam R heats the magnetooptical recording medium 5 to either a temperature in excess of the Curie temperature of the reproducing layer 1, the memory layer 2, and the recording layer 3, or a second temperature $T_2$ in the vicinity of which the coercive force is sufficiently small. Inasmuch as the temperature of at least the memory layer 2 is higher than the Curie temperature thereof, in the event that a recording pit 21 is present as a latent image in advance, as shown in FIG. 6, the memory layer 2 is magnetized in the same direction as the recording pit 21, i.e., remains magnetized. In the event that there is no recording pit 21 present as a latent image, the memory layer 2 is newly magnetized in the same direction as the recording magnetic field $H_{rec}$, forming a recording pit 21 thereby to record a second state which may be of "1", for example.

To form minute recording pits 21, the magnetooptical recording medium 5 is heated to the second temperature $T_2$ only in a region smaller than the hatched high-temperature region in the laser beam spot Sp shown in FIG. 4.

In the recording process, as described above, desired information can be recorded in binary form using selectively one of the two power values of the laser beam R. As shown in FIG. 2, the optical recording and reproducing head 10 has an optical modulator 13 for modulating the laser beam R in intensity or laser power to achieve selectively one of the two power values of the laser beam R.

Figure 7:
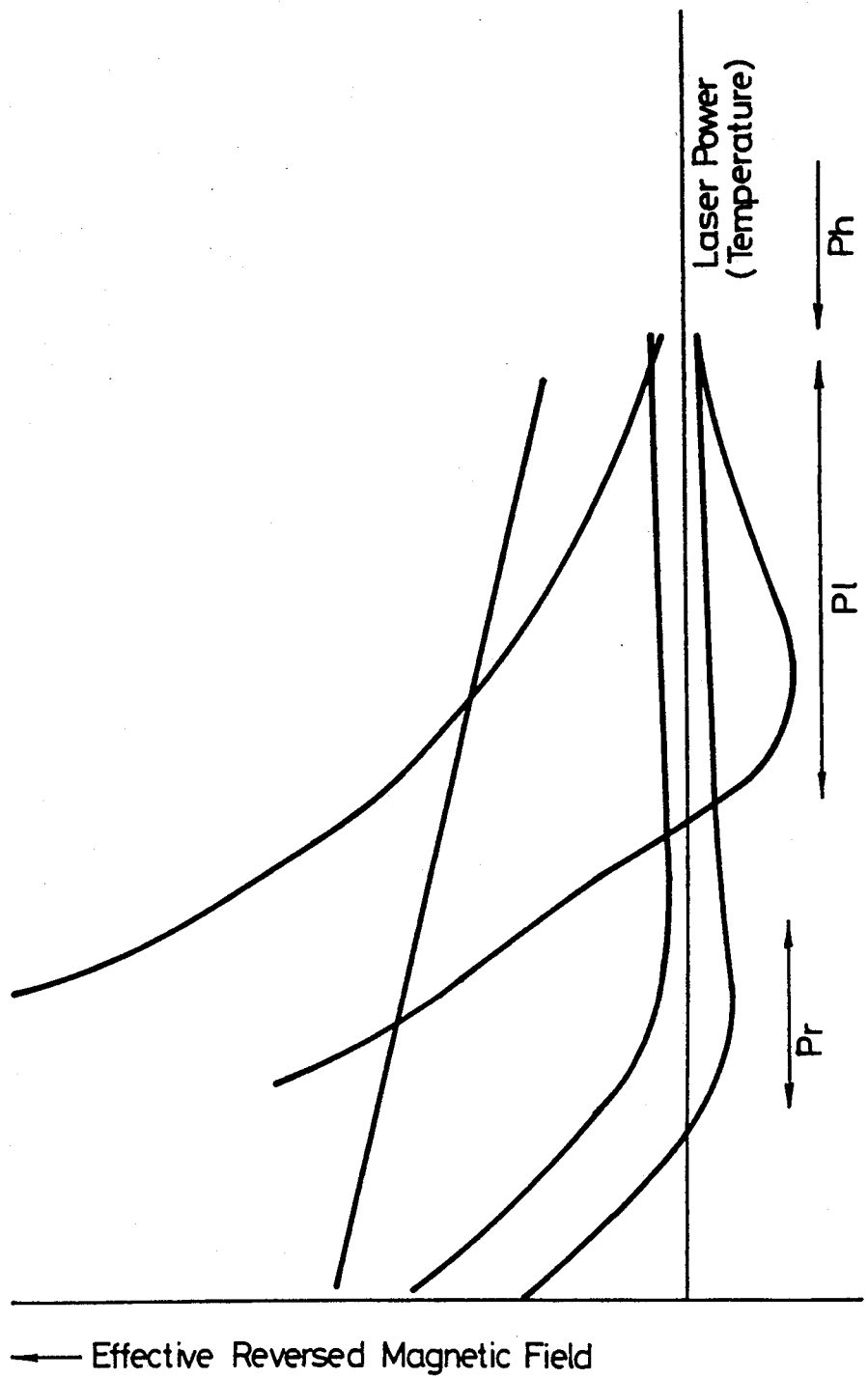
FIG. 7 is a graph showing the relationship between laser power and coercive and exchange forces of each layer of the magnetooptical recording medium shown in FIG. 1.

The temperature or the power of the laser beam R and the coercive and exchange forces are selected to be of the relationship as shown in FIG. 7.

The powers Pr, Pl, Ph of the laser beam R used in the reproducing process and the recording process to record the first and second states may be selected such that the power Pr ranges from 2.5 to 3.5 mW, the power Pl from 6 to 8 mW, and the power Ph from 15 to 20 mW.

The method according to the above first embodiment is thus capable of overwriting information and also of reproducing information with super-resolution. Since the initializing magnetic field $H_{ini}$ is shared by the reproducing and recording processes, the magnetooptical drive device used to effect the reproducing and recording processes is relatively simple in structure.

In the first embodiment, the multilayer magnetic film 4 is of a three-layer structure composed of a reproducing layer 1, a memory layer 2, and a recording layer 3. Actually, the three-layer structure poses strict limitations on the selection of characteristics of the layers and hence the compositions and the thicknesses of the layers, and makes it difficult to achieve sufficient magnetooptical effects. In industrial applications, it is preferable that a magnetooptical recording medium include a multilayer magnetic film of a six-layer structure. Such a multilayer magnetic film of a six-layer structure will be described below.

Embodiment 2

Figure 8:
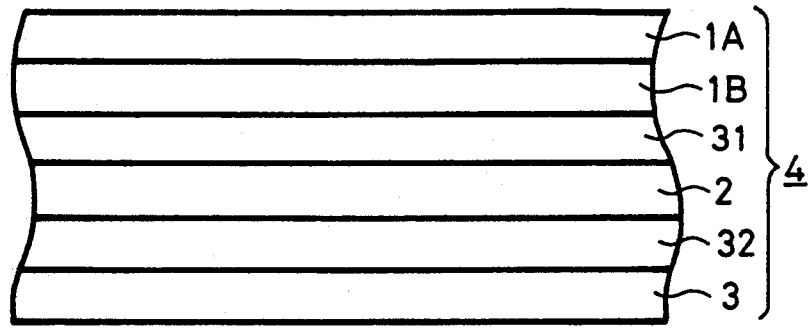
FIG. 8 is a fragmentary cross-sectional view of a multilayer magnetic film of another magnetooptical recording medium used in the present invention.

As shown in FIG. 8, a multilayer magnetic film 4 includes a main reproducing layer 1A, an auxiliary reproducing layer 1B, a memory layer 2, and a recording layer 3. The main and auxiliary reproducing layers 1A, 1B jointly provide combined characteristics necessary as a recording layer. The multilayer magnetic film 4 also has a first intermediate layer 31 interposed between the auxiliary reproducing layer 1B and the memory layer 2, and a second intermediate layer 32 between the memory layer 2 and the recording layer 3.

The main reproducing layer 1A is made of GdFeCo, the auxiliary reproducing layer 1B of TbFeCo, the first intermediate layer 31 of GdFeCo, the memory layer of TbFeCo, the second intermediate layer 32 of GdFeCo, and the recording layer 3 of GdTbFeCo. Each of these layers comprises an amorphous layer.

The main reproducing layer 1A, which serve to reproduce recorded information by way of the magnetooptical effect, is mainly composed of materials, i.e., Gd, Fe, Co, whose Curie temperature $T_{c1}$ is high and which exhibit a high magnetooptical interaction. The composition of these materials is such that the transition metal is richer with the compensation temperature being close to room temperature. The main reproducing layer 1A has no or little perpendicular magnetic anisotropy, and its coercive force $H_{c1A}$ does not exhibit the characteristics shown in FIG. 7. The main reproducing layer 1A has a thickness $h_{1A}$ which should preferably be equal to or greater than a so-called skin depth which is the depth to which a reproducing laser beam or reading laser beam enters the magnetooptical recording medium. If a semiconductor laser which emits a reproducing laser beam having a wavelength of 780 nm is employed, then the thickness $h_{1A}$ is $h_{1A} \geq 30$ nm.

In the case where the main reproducing layer 1A is of such a composition which exhibits a high magnetooptical interaction, as described above, its perpendicular magnetic anisotropy and coercive force are small, and it does not exhibit the characteristics shown in FIG. 7. These properties of the main reproducing layer 1A are compensated for by the auxiliary reproducing layer 1B.

The auxiliary reproducing layer 1B is mainly composed of Tb, Fe, Co whose coercive force and perpendicular magnetic anisotropy are large. At temperatures lower than the reproducing temperature (reproducing laser power Pr), the main and auxiliary reproducing layers 1A, 1B are coupled by exchange forces stronger than their coercive forces. Therefore, the main and auxiliary reproducing layers 1A, 1B operate together magnetically. Below the reproducing temperature, their coercive forces and exchange forces which indicate their operation are represented by the averages of these forces of the layers 1A, 1B. The average coercive force is indicated by $H_{c1}$ and the average exchange force by $H_{w1}$. Curves 91, 92 shown in FIG. 9 represent the sum $(H_{c1}+H_{w1})$ of the average coercive force $H_{c1}$ and the average exchange force $H_{w1}$ and the difference $(H_{c1}-H_{w1})$ of the average coercive force $H_{c1}$ and the average exchange force $H_{w1}$. The Curie point of the auxiliary reproducing layer 1B is slightly higher than the reproducing temperature, i.e., the laser beam power Pr, and the exchange force from the memory layer 2 is cut off at temperatures higher than the Curie point. Thus, the curves 91, 92 are aligned with each other at those temperatures. In the vicinity of the reproducing temperature, however, the coercive and exchange forces exhibit the same characteristics as those shown in FIG. 7, allowing recorded information to be reproduced with super-resolution as described above in Embodiment 1.

Since the exchange force $H_{w1}$ with respect to the reproducing layer 1A is lost beyond the reproducing temperature, i.e., the laser beam power Pr, the characteristics of the memory layer 2 can be designed with greater freedom in Embodiment 1.

The first intermediate layer 31 serves to stably maintain the magnetic domain wall at normal temperature. The first intermediate layer 31 is mainly composed of Gd, Fe, Co which have small perpendicular magnetic anisotropy and coercive forces. The interfacial magnetic domain wall energy $\sigma_{w12}$ and the exchange force $H_{w1}$ in the first intermediate layer 31 can be controlled by varying the thickness and composition of the first intermediate layer 31. If the characteristics shown in FIG. 9 were to be obtained without the first intermediate layer 31, the thicknesses of the main and auxiliary reproducing layers 1A, 1B would have to be considerably increased, as can be understood from the equation (6) above. If the thicknesses of the main and auxiliary reproducing layers 1A, 1B were increased, then it would be necessary to increase the laser beam power to be consumed in the recording process, resulting in a reduction in sensitivity.

The memory layer 2 is a layer for holding recording pits, as is apparent from the description of Embodiment 1. At normal temperature, the memory layer 2 is required to have a coercive force of the initializing magnetic field $H_{ini}$ or higher. In a temperature range produced by the low power Pl for recording the first state, the coercive force of the memory layer 2 is reduced lower than the coercive force of the recording layer 3 and the exchange force $H_{w23}$ between the memory layer 2 and the recording layer 3. The memory layer 2 is mainly composed of Tb, Fe, Co, and has a composition whose compensation temperature is slightly lower than normal temperature. As described above with reference to FIG. 5, the memory layer 2 is magnetized in the same direction as the recording layer 3 in the temperature range of the low power Pl.

In the temperature range of the low power Pl, the temperature of the auxiliary reproducing layer 1B exceeds the Curie point as described above. If the temperature of the auxiliary reproducing layer 1B did not exceed the Curie point, it would be necessary to design the multi-layer magnetic film 4 such that the main reproducing layer 1A, the auxiliary reproducing layer 1B, the first intermediate layer 31, and the memory layer 2 would be magnetized in the same direction as the recording layer 3. Since, however, the temperature of the auxiliary reproducing layer 1B exceeds the Curie point, only the first intermediate layer 31 and the memory layer 2 are required to be designed for magnetization in the same direction as the recording layer 3.

The second intermediate layer 32 is also a layer for controlling the interfacial magnetic domain wall energy and the exchange forces as with the first intermediate layer 31. The second intermediate layer 32 is composed of the same materials as the first intermediate layer 31.

The coercive force of the recording layer 3 at normal temperature needs to be smaller than the initializing magnetic field $H_{ini}$ as the recording layer 3 is to be initialized by the initializing magnetic field $H_{ini}$. In the temperature range of the low power Pl, the coercive force of the recording layer 3 is required to be greater than the coercive force of the memory layer 2. Therefore, the Curie temperature of the recording layer 3 is high. To reduce temperature-dependent changes in the coercive force, the recording layer 3 is mainly composed of Tb, Gd, Fe, Co with the transition metal being richer.

In Embodiment 2, the six-layer film structure of the multilayer magnetic film 4 allows the layer characteristics to be desired easily and hence permits the layer materials to be selected with relative ease. Embodiment 2 may be modified in various ways. For example, the exchange force may be cut off in the first intermediate layer 31 rather than in the auxiliary reproducing layer 1B, and the first intermediate layer 31 may be of a structure of plane anisotropy.

With the present invention, the information recorded on the magnetooptical recording medium is reproduced with super-resolution, and new information is recorded on the magnetooptical recording medium in the overwriting mode in which any previously recorded information is not erased before the new information is recorded. Accordingly, the time which would otherwise be required to erase any existing recorded information is not necessary. The magnetooptical drive device may be of a relatively simple arrangement because the initializing magnetic field $H_{ini}$ is shared by the recording and reproducing processes.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. A method of recording information on and reproducing information from a magneto-optical recording medium having a multilayer magnetic film comprising at least a reproducing layer, a memory layer, and a recording layer which are successively deposited in magnetically coupled relationship to each other, said method comprising the steps of:

recording information on the magneto-optical recording medium selectively in a first state in which the reproducing layer and the memory layer are magnetized by copying a magnetized condition of the recording layer, with a intensity-modulated light beam of a low intensity applied to the magneto-optical recording medium, or a second state in which the reproducing layer, the memory layer, and the recording layer are magnetized by an external recording magnetic field, with a intensity-modulated light beam of a high intensity applied to the magneto-optical recording medium; and reproducing recorded information from the magneto-optical recording medium by copying the information from the memory layer to the reproducing layer in a limited high-temperature region which is produced due to a temperature distribution within a spot of a reproducing light beam applied to the magneto-optical recording medium.

2. A method according to claim 1, wherein said multilayer magnetic film comprises a main reproducing layer, an auxiliary reproducing layer, a first intermediate layer, a memory layer, a second intermediate layer, and a recording layer which are successively deposited in magnetically coupled relationship to each other.

* * * * *